United States Patent
Noordanus et al.

(10) Patent No.: US 8,528,596 B2
(45) Date of Patent: *Sep. 10, 2013

(54) DISTRIBUTOR WITH A ROTATABLE U-SHAPED CONNECTING CHANNEL

(75) Inventors: Maximiliaan Noordanus, Noord Scharwoude (NL); Eric Michaël Cornelis Maria Van Eijnatten, Obdam (NL)

(73) Assignee: Bravilor Holding B.V. (NL)

( * ) Notice: Subject to any disclaimer, the term of this patent is extended or adjusted under 35 U.S.C. 154(b) by 314 days.

This patent is subject to a terminal disclaimer.

(21) Appl. No.: 12/991,416

(22) PCT Filed: May 5, 2009

(86) PCT No.: PCT/NL2009/050242
§ 371 (c)(1),
(2), (4) Date: Dec. 7, 2010

(87) PCT Pub. No.: WO2009/136787
PCT Pub. Date: Nov. 12, 2009

(65) Prior Publication Data
US 2011/0067774 A1     Mar. 24, 2011

(30) Foreign Application Priority Data

May 6, 2008 (NL) ...................................... 2001560

(51) Int. Cl.
*F16K 11/074* (2006.01)
*F16K 24/00* (2006.01)
*F16K 31/53* (2006.01)

(52) U.S. Cl.
USPC ................... 137/625.11; 137/216; 251/129.1; 251/249.5

(58) Field of Classification Search
USPC ............. 137/216, 625.11; 251/129.11, 249.5
See application file for complete search history.

(56) References Cited

U.S. PATENT DOCUMENTS

| | | | | |
|---|---|---|---|---|
| 758,188 A * | 4/1904 | Miller | ............................ | 137/216 |
| 825,370 A * | 7/1906 | Zurbuch | ................... | 137/625.11 |
| 2,979,963 A | 4/1961 | Snoy | | |
| 3,076,478 A * | 2/1963 | Winders | .................... | 137/625.11 |
| 3,520,327 A * | 7/1970 | Abbott et al. | ............ | 137/625.11 |
| 3,633,621 A | 1/1972 | Myers | | |
| 4,156,437 A | 5/1979 | Chivens et al. | | |
| 4,253,494 A * | 3/1981 | Cooke | ........................ | 137/625.23 |
| 4,366,839 A * | 1/1983 | Slavin | ........................ | 137/625.11 |
| 4,410,001 A * | 10/1983 | Goguen | .................... | 137/625.11 |
| 5,046,522 A * | 9/1991 | Le Devehat et al. | ..... | 137/625.11 |
| 5,927,330 A * | 7/1999 | Minton et al. | ............ | 137/625.11 |
| 7,059,341 B2 * | 6/2006 | Kumar et al. | .................. | 137/216 |
| 7,100,623 B2 * | 9/2006 | Assmann et al. | ......... | 137/625.11 |

* cited by examiner

*Primary Examiner* — John Rivell
(74) *Attorney, Agent, or Firm* — Fliesler Meyer LLP

(57) ABSTRACT

Distributor (5) with at least two discharge channels (10,16) and feed channel (11) arranged at an equal distance from and parallel to a central shaft and a distributor body (12,17,18) arranged rotatably around the shaft with a feed end (12') disposed along the shaft and a discharge end (12") disposed at a radial distance therefrom, which, by way of rotation of the distributor body can be selectively and fluidly connected with the respective discharge channels, wherein the fluid feed channel extends along the central shaft and along the discharge channels, wherein the distributor body comprises a U-shaped connecting channel (12) and can be arranged together with the feed end rotatably in the line of projection of the feed channel in fluid connection with the respective discharge channels, characterized in that the U-shaped connecting channel is provided, in close proximity to an upper side, with a breather duct (32) (FIG. 5,6) extending through a perimeter wall of the channel in the through-flow direction up to the U-shaped connecting channel.

4 Claims, 3 Drawing Sheets

DISTRIBUTOR WITH A ROTATABLE U-SHAPED CONNECTING CHANNEL

Figure 1:
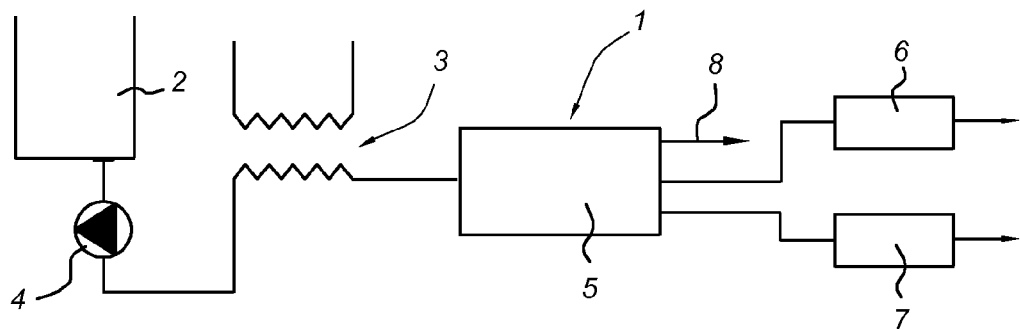

The invention relates to distributor with at least two discharge channels and feed channel arranged at an equal distance from and parallel to a central shaft and a distributor body disposed rotatably around the shaft with a feed end disposed along the shaft and a discharge end disposed at a radial distance therefrom, which, by way of rotation of the distributor body can be selectively and fluidly connected with the respective discharge channels, wherein the fluid feed channel extends along the central shaft and along the discharge channels, wherein the distributor body comprises a U-shaped connecting channel and can be arranged together with the feed end rotatably in the line of projection of the feed channel in fluid connection with the respective discharge channels, characterized in that the U-shaped connecting channel is provided, in close proximity to an upper side, with a breather duct extending through a perimeter wall of the channel in the through-flow direction up to the U-shaped connecting channel.

In such a device, for example, water is conveyed from the water reservoir to a heating device from which warm water is conveyed to a distributor. The warm water is delivered to a user and/or to one or more drinks processing devices via the distributor. This is described, for example, in NL6000164 and NL6000166.

EP 1245013 and P 0811345 describe systems which operate on the basis of gravitational force and which deliver a fixed quantity of fluid. Such a system is not suitable for the delivery of variable quantities of fluid, such as water. Furthermore, only a limited volume of fluid can be delivered per unit of time, using the known systems.

Another drawback of the known systems is that the various parts always need to be in a more or less fixed position in relation to one another. This means that a fixed space must be reserved in an apparatus with limited freedom in order for the system to be used, thus limiting options in the design of the apparatus. Particularly in devices where one of the requirements is that they must be capable of delivering both a relatively small quantity of drink or water (0.1 to 0.2 liter), as well as also being able to rapidly deliver 1.8 liters for a jug, these drawbacks are a handicap. In addition, there are usually also the requirements that the device be as compact (small) as possible and that such dispensing devices are expected to be capable of making multiple of drinks from various different ingredients. The combination of requirements, delivery of approximately 0.15 liter to approximately 1.8 or more liters in a relatively short period of 10 to 90 seconds, several drinks from water and various ingredients and a very compact design, means that the reservoir and the dimensions of the system must be sufficiently large, yet be constructed very compactly, so that optimal use is made of any space in the device.

A distributor is known from U.S. Pat. No. 3,633,621 according to the preamble of claim 1. The known pneumatic switch can selectively connect multiple discharge channels with a central feed channel by means of a rotatable U-shaped connecting channel. In this manner, switching between discharge channels occurs by manually turning a knob that is connected with the connecting channel. In the known device, no provisions are made for the use of a precision drive by means of an electromotor and it is not clear how this can be achieved within a very limited or compact space. Further to this, air may accumulate at the upper side of the U-shaped connecting channel, thus impeding the distribution of the fluid.

It is therefore an object of the invention to provide a distributor with which fluids with a relatively high flow rate can be delivered to various drink dispensing devices and/or users. It is a further object of the invention to provide a distributor with relatively small dimensions.

In addition, it is an object of the invention to provide a distributor with a compact breather.

To this end, a distributor according to the invention is characterized in that the U-shaped connecting channel is provided in close proximity to an upper side with a breather duct which extends through a perimeter wall of the channel in the through-flow direction up to the inside of the U-shaped connecting channel.

Because the feed channel extends along the discharge channels, the dimensions of the distributor remain restricted. The U-shaped channel also deflects the fluid at greater flow rates and in the reverse direction of the feed channel towards the discharge channels without the fluid being permitted to flow over or spill over the edge of the discharge channels. Accordingly, relatively high flow rates can be delivered by the distributor to one of a multiple of discharge channels.

The U-shaped connecting channel is provided close to an upper side with a breather duct which extends through the perimeter wall of the channel in the direction of flow up to the U-shaped connecting channel. The inflowing water can pass along the breather duct, which extends partially in the flow direction of the connecting channel, whilst rising vapour or air can accumulate at the top of the U-shaped connecting channel and be discharged via the breather opening to the breather device or into the direct environment.

In one embodiment, the U-shaped connecting channel is attached to a cylindrical drive wall with a longitudinal shaft disposed in the line of projection of the central shaft, the drive wall being provided along its upper side with toothing which engages a drive means for the rotation of the U-shaped connecting channel. The toothing on the upper side of the drive wall enables the lateral dimension of the distributor to remain relatively small. The drive means may comprise a gearwheel, driven by an electromotor, and which engages the vertically directed toothing of the drive wall in order to cause driven rotation thereof.

In a further embodiment, the U-shaped connecting channel is provided in close proximity to an upper side with an annular bearing wall encompassing the breather opening in the outer wall of the U-shaped connecting channel, and which engages with a cam extending to within the wall or which protrudes in through an opening in a cover plate of the distributor. The U-shaped connecting channel is made to rotate on bearings by the bearing wall between the feed channel on the one side and a cover plate of the distributor on the other. The U-shaped connecting channel is provided on a lower side with an annular bearing wall with a shoulder, which falls into a groove around the feed channel, wherein the shoulder is supported by an upper face of the feed channel. In this manner a simple, fluid-tight rotatable connection from the connecting channel to the feed channel is achieved.

Figure 2:
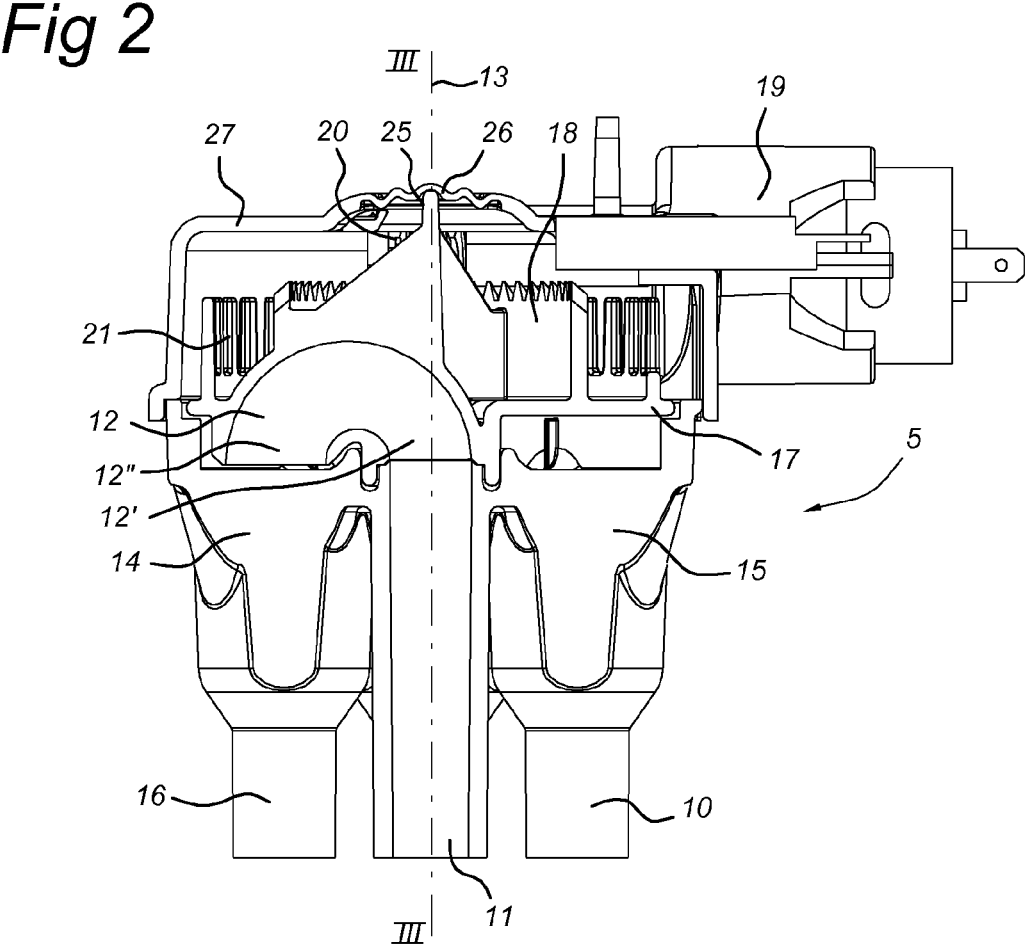
Figure 3:
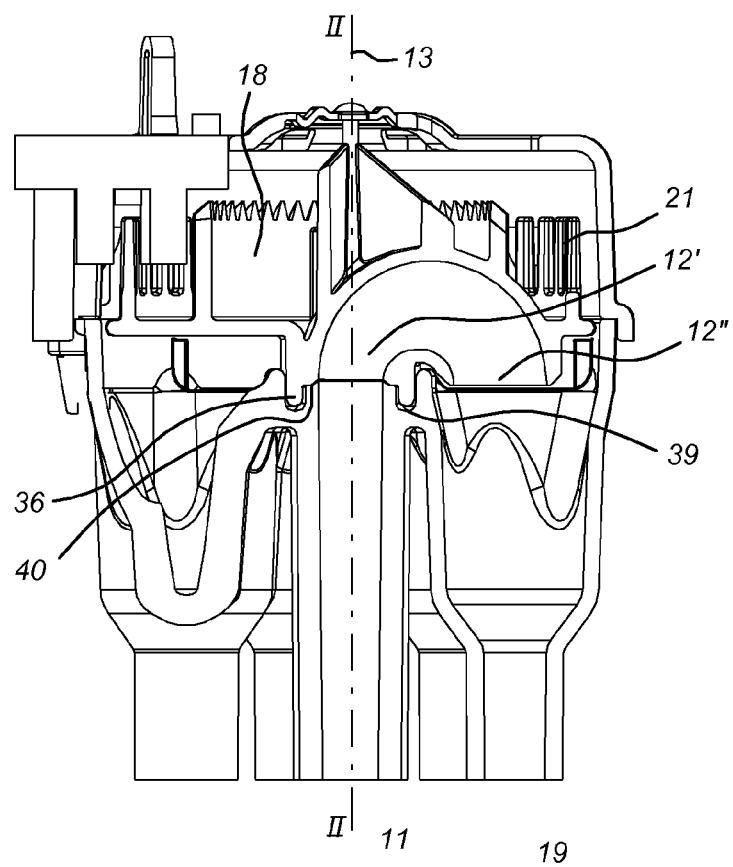
Figure 4:
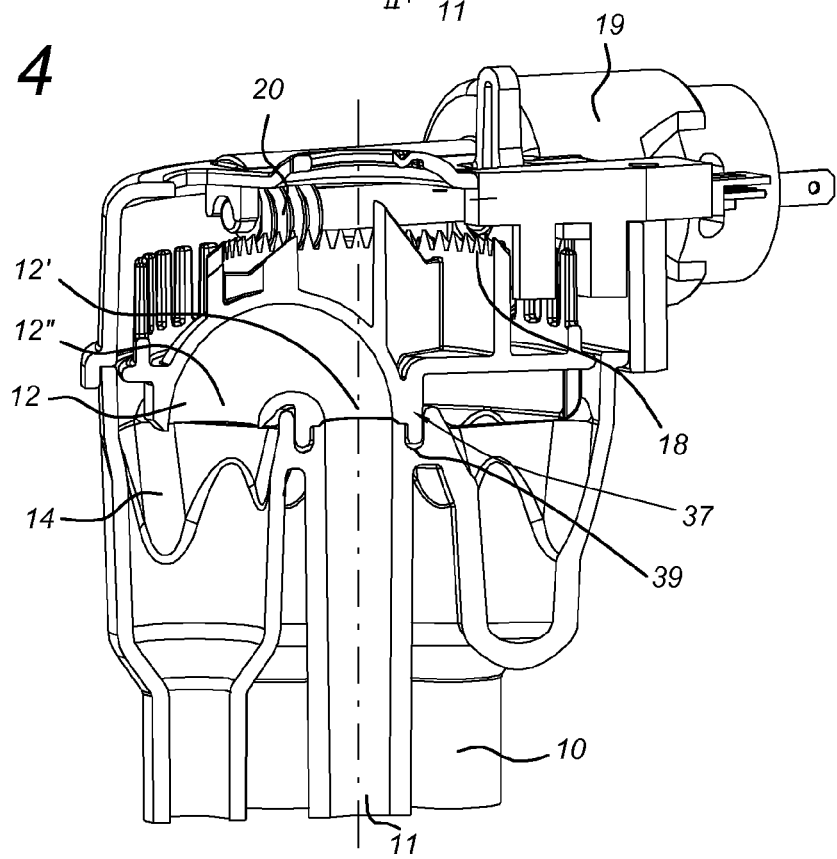
Figure 5:
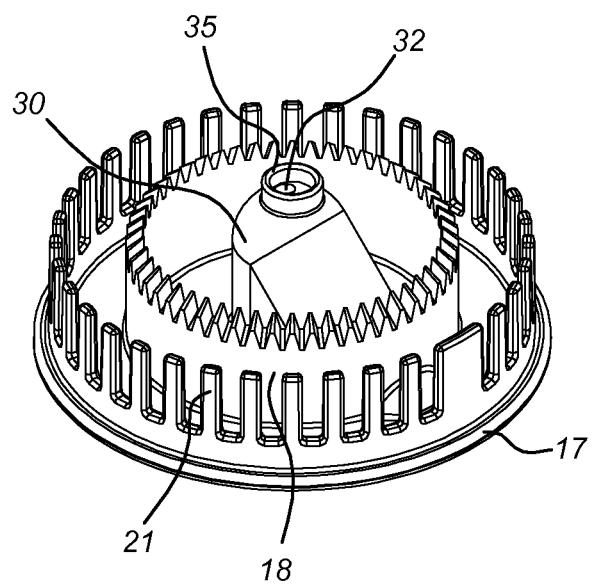
Figure 6:
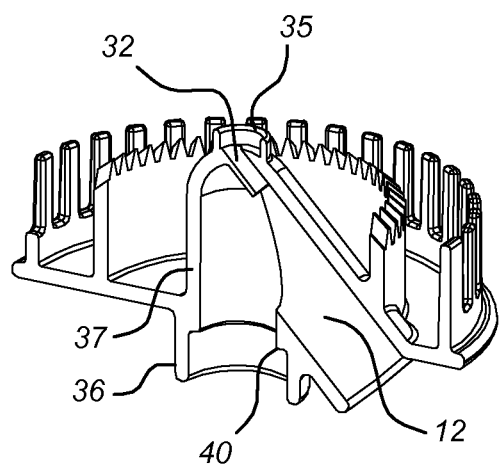

Several embodiments of a distributor according to the invention will be described in further detail by way of example with reference to the accompanying drawing, wherein:

FIG. 1. shows a schematic view of a drink dispensing device, wherein the distributor according to the invention can be applied, FIG. 2 shows a cross-section of a distributor according to the invention, along a vertical line II-II FIG. 3 shows a cross-section of the distributor according to FIG. 2, along the line III-III FIG. 4 shows a perspective view of a distributor according to FIG. 2 and FIG. 3, FIG. 5 shows a view in perspective of a distributor disc with the U-shaped connecting channel, a drive wall, toothing and a breather opening, and FIG. 6 shows a cross-section view through the distributor according to FIG. 5.

FIG. 1. shows a drinks dispensing system 4, for example a coffee machine, with a water reservoir 2, a heat-exchanger 3, a pump 4, a distributor 5 and drinks processing means 6 and 7. Upon being heated to a temperature of approximately 80° C. in the heat exchanger 3, the water in the water reservoir (2) is delivered by the pump 4 to an inlet of the distributor 5. Here, the flow rate may amount to between 0.1 and 0.2 liters per minute and is delivered directly to a user via an outlet 8, or, for example, to one of the drinks processing devices 6, 7 for making coffee, or any other warm drink like soup. The flow rate may also amount to 1.8 l per minute or more for the delivery of a quantity of warm water to a jug via outlet 8.

If desired, this higher flow rate may also be delivered to the drinks processing means 6, 7.

The distributor 5, as shown in FIG. 2, has a centrally and downwardly directed inlet 11 which enables the fluid, the water, to flow into the distributor from underneath.

In addition to the central inlet 11, a tubular guide 12 is attached which runs in an inverse U. One of the legs of the inverse U connects to the inlet 11, the other leg being rotated around the central shaft 13 up to the uppermost side of the outflows 14, 15 of the discharge channels 10, 16 of the distributor. The distributor may serve two to six discharge channels, for example, which are arranged in a circular pattern, with the inlet 11 as its centerpoint.

The U-shaped guide 12 is attached to the plate 17 with a crown gear 18 disposed thereon which, in conjunction with a gearwheel, driven by a motor 19, ensures the rotation. Further to this, a detector crown 21 is mounted to the plate 17, so that the plate 17 and therefore also the outflow of the U-shaped guide 12 can be positioned exactly above outflow 14, 15 via a detector and the electronic control of the motor 19.

The plate 17 is rotatably supported via a cam 25 in a cavity 26 of the cover plate 27. The design of this cavity 26 is arranged somewhat spring-mounted in the cover plate 27. Openings are provided around the cavity 26 (not shown in the figure) through which vapour and air can escape. To this end, a breather hole can be provided in the U-shaped guide 12.

In FIG. 5 and FIG. 6 an embodiment is shown wherein a breather opening 32 is arranged on the upper side of the bend 30 in the U-shaped guide 12, constructed in such a manner that it prevents the inflow of flowing water. This can very well be achieved by forming the breather opening in such a manner that the longitudinal flow of water is caused to flow along and around it by the inertia of the movement, at the same time avoiding the air present therein. The channel of the breather opening 32 may also be applied advantageously in the embodiments according to FIG. 2-4.

Air and vapour can escape through the spaces and seams between the circular outflow of the U-shaped guide and the outlets of the distributor device. The latter have a rectangular trapezoidal shape (sectors or segments of a circle) on the side of the guide at a further distance therefrom and gradually transform to a circular shape which, in the longitudinal direction, is funnel-shaped. Tubes are connected to the discharge channels 10, 16, which deliver fluid to the users and/or drinks processing means or devices, or directly out of the device via an outlet.

In the embodiment according to FIG. 5 and FIG. 6, the rotating disc 17 with the U-shaped guide 12 disposed therein has a pivot/bearing in the form of an edge 36 on the central leg 37 of the U-shape which falls into a groove 39 on the upper side of the inlet 11. By constructing the outer perimeter of the edge stepwise, with a shoulder 40, countered by a corresponding stepped edge along the perimeter of the groove 39, a labyrinth crest is formed which sufficiently prevents any water flow from leaking through. This is especially the case if some sort of lubricant in the form of a suitable grease is applied therein. The latter is applied in order to facilitate movement and to reduce wear.

In one embodiment according to FIG. 5 and FIG. 6, a protuberance is provided on the upper side of the same central shaft 13 of the bearing constructions on the lower side, which slots into a hole in the cover plate 27 of the distributor device, so that the disc 17 is also supported there, without impeding the desired movement.

The protuberance 35 may be constructed concave and, as a result, can form the discharge of the breather opening 32 of the inverse U. The cavity in the upper cover 27 can be connected via a tube to a breather system as disclosed in EP1462040.

The invention claimed is:

1. Distributor (5) for a drink dispersing system with at least two discharge channels (10, 16) and a feed channel arranged at an equal distance from and parallel to a central shaft (13), and a distributor body (12, 17, 18) disposed rotatably around the shaft (13) with a feed end (12') disposed along the shaft (13) and a discharge end (12") disposed at a radial distance therefrom, which, by way of rotation of the distributor body (12, 17, 18) can be selectively and fluidly connected with the respective discharge channels (10, 16), wherein the feed channel (11) extends along the central shaft (13) and along the discharge channels (10, 16), wherein the distributor body comprises a U-shaped connecting channel (12) and can be arranged together with the feed end (12') rotatably in the line of projection of the feed channel (11) in fluid connection with the respective discharge channels (10, 16) characterized in that the U-shaped connecting channel (12) is provided, in close proximity to an upper side, with a breather duct (32) extending through a perimeter wall of the channel (12) in the through-flow direction up to the U-shaped connecting channel (12), and wherein the U-shaped connecting channel is provided in close proximity to an upper side with an annular bearing wall (35) extending around a breather opening in the outer wall of the U-shaped connecting channel (12) and which engages with a cam extending to the inside of the annular bearing wall (35) or which protrudes through an opening in a cover plate (27) of the distributor (5).

2. Distributor (5) according to claim 1, wherein the U-shaped connecting channel (12) is attached to a cylindrical drive wall (18) with a longitudinal shaft disposed in the line of projection of the central shaft (13), the drive wall being provided along its upper side with toothing which engages a drive means (19, 20) for the rotation of the U-shaped connecting channel (12).

3. Distributor (5) according to claim 1, wherein the U-shaped connecting channel (12) is provided with an annular bearing wall (36) with a shoulder (40), which slots (39) into a groove around the feed channel (11), wherein the shoulder is supported by an upper face of the feed channel (11).

4. Distributor (5) according to claim 2, wherein the U-shaped connecting channel (12) is connected to a cam (25) disposed along the central drive shaft (13) with a spring-mounted cavity (26) in the cover plate (27).

* * * * *